United States Patent [19]

Chao

[11] Patent Number: 5,393,608
[45] Date of Patent: Feb. 28, 1995

[54] NON-SILICONE RELEASE POLYMER

[75] Inventor: Hung Y. Chao, Plainsboro, N.J.

[73] Assignee: Moore Business Forms, Grand Island, N.Y.

[21] Appl. No.: 65,914

[22] Filed: May 25, 1993

[51] Int. Cl.⁶ .............................................. C09J 7/02
[52] U.S. Cl. ................................... 428/352; 526/327
[58] Field of Search .................. 428/40, 352; 526/327, 526/329.7

[56] References Cited

U.S. PATENT DOCUMENTS

| | | |
|---|---|---|
| 2,607,711 | 8/1952 | Hendricks . |
| 2,876,894 | 3/1959 | Dahlquist et al. . |
| 3,067,057 | 12/1962 | Dabroski . |
| 3,543,920 | 12/1970 | Crocker et al. . |
| 4,062,817 | 12/1977 | Westerman . |
| 4,190,562 | 2/1980 | Westerman . |
| 4,299,741 | 11/1981 | Doehnert . |
| 4,342,815 | 8/1982 | Doehnert . |
| 4,398,985 | 8/1983 | Eagon . |
| 4,587,156 | 5/1986 | Wu . |
| 4,599,260 | 7/1986 | Truskolaski et al. . |
| 4,613,483 | 9/1986 | Cohen .................. 422/131 |
| 4,692,502 | 9/1987 | Uebele ................. 526/193 |
| 4,696,983 | 9/1987 | Cohen .................. 526/62 |
| 4,758,641 | 7/1988 | Hsu ..................... 526/208 |
| 5,064,717 | 11/1991 | Suzuki et al. . |

FOREIGN PATENT DOCUMENTS 621198  5/1961  Canada .

Primary Examiner—Jenna L. Davis
Attorney, Agent, or Firm—Finnegan, Henderson, Farabow, Garrett & Dunner

[57] ABSTRACT

A non-silicone release material for use with pressure sensitive adhesives, which contains a copolymer of:

(1) an acrylate ester of the formula I:

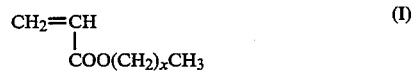

wherein x ranges from about 30 to about 50; and (2) at least one comonomer selected from a vinyl monomer, an acrylate monomer or a methacrylate monomer. Preferably, the acrylate ester is about 1 to about 25% by weight of the copolymer composition. The release material can be used as a backsize for pressure sensitive adhesives, particularly repositionable labels.

20 Claims, No Drawings

NON-SILICONE RELEASE POLYMER

BACKGROUND OF THE INVENTION

The present invention relates to a release material for a pressure sensitive adhesive. More particularly, the invention relates to a non-silicone polymer suitable for use as a release material for repositionable adhesives, and capable of being selectively modified to achieve a particular desired release power.

Rolls of pressure sensitive adhesives typically have a release agent, often called a "backsize," applied to the back side of the adhesive substrate to permit easy unwinding. Such release agents or backsizes are particularly crucial if the adhesives are stored for long periods of time.

It is important that release materials do not adversely affect the adhesive properties of the adhesive materials they contact. Also, release materials should be capable of maintaining their effectiveness over prolonged periods of time and upon exposure to a wide range of temperatures.

Traditionally, silicone compounds have been used as release materials for the various types of pressure sensitive adhesives. However, the release power of silicone compounds is generally very high. For many applications that require lower release power, such as the repositionable adhesives, the high release power is undesirable.

The principal advantage of the present invention is the provision of a release material for pressure sensitive adhesives that substantially obviates one or more of the limitations and disadvantages of the described prior release materials.

The present invention is directed to a release material for pressure sensitive adhesives that has a relatively low release power.

The invention is also directed to a release material for pressure sensitive adhesives that can be modified to provide the desired release power.

The invention is also directed to a release material suitable for use with repositionable pressure sensitive adhesives.

The invention is also directed to a release material for pressure sensitive adhesives that does not adversely affect the adhesive properties of the adhesive material upon contact.

The invention is further directed to a release material for pressure sensitive adhesives that maintains its release properties over time and exposure to elevated temperatures.

Additional features and advantages of the invention will be set forth in the written description which follows, and in part will be apparent from the written description or may be learned from the practice of the invention. The advantages of the invention will be realized and attained by the release material particularly pointed out in the written description and claims hereof.

SUMMARY OF THE INVENTION

To achieve these and other advantages, and in accordance with the purpose of the invention, as embodied and broadly described herein, the present invention provides a release polymer for use with pressure sensitive adhesives. The release polymer comprises a copolymer of:

(1) an acrylate ester of the formula I:

wherein x ranges from about 30 to about 50; and (2) at least one comonomer selected from a vinyl monomer, an acrylate monomer or a methacrylate monomer. Preferably, the acrylate ester of the formula (I) comprises about 1 to about 25% by weight of the copolymer composition.

In accordance with another embodiment of the invention, as embodied and broadly described herein, the present invention provides a pressure sensitive adhesive tape. The tape comprises a substrate, a pressure sensitive adhesive coated onto the face of the substrate and the release polymer of the invention coated onto the backside of the substrate.

In accordance with another embodiment of the invention, as embodied and broadly described herein, the present invention provides a repositionable label. The label comprises a substrate, a pressure sensitive adhesive coated onto at least a portion of the face of the substrate and the release polymer of the invention coated onto at least a portion of the backside of the substrate.

Further advantages and features of the invention will become more apparent from a detailed consideration of the remainder of the specification including the Examples and the appended claims.

It is to be understood that both the foregoing general description and the following detailed description are exemplary and explanatory and are intended to provide further explanation of the invention as claimed.

DETAILED DESCRIPTION OF THE PREFERRED EMBODIMENTS

In accordance with the invention, as embodied and broadly described herein, a release polymer is provided comprising a copolymer of:

(1) an acrylate ester of the formula I:

wherein x ranges from about 30 to about 50; and (2) at least one comonomer selected from a vinyl monomer, an acrylate monomer or a methacrylate monomer.

The acrylate ester of the invention of formula (I) is available as Petrolite X-5100 (from Petrolite Corporation, Tulsa, Okla).

The comonomers that can be used in accordance with the invention include, but are not limited to, vinyl acetate, styrene, acrylonitrile, methacrylonitrile, methyl methacrylate, ethyl acrylate, 2-ethyl hexyl acrylate, isooctyl acrylate, isodecyl acrylate, isodecyl methacrylate, isobutyl acrylate, 4-methyl-2-pentyl acrylate, 2-methylbutyl acrylate, isoamyl acrylate and isononyl acrylate.

The release power of the copolymers of the invention can be selectively altered by varying the ratio of the acrylate ester (I) to the comonomer. Generally, the greater the amount of the acrylate ester (I) in the copolymer, the higher the release power. Preferably, the acrylate ester (I) is incorporated in an amount of about 1 to about 25% by weight of the weight of the copolymer.

The copolymer of the invention is preferably prepared by a suspension polymerization process. In the suspension polymerization process, an appropriate amount of the acrylate ester (I) and the comonomer or comonomers, together with a free radical initiator, are emulsified into an aqueous suspension agent to obtain an oil-in-water suspension. The suspension is then heated to a temperature preferably ranging from about 75° C. to about 105° C. where a reaction exotherm is observed. The reaction mixture is preferably held at a temperature of about 80°–99° C. for a period preferably ranging from about 2 to about 16 hours to complete the copolymerization reaction. The resulting slurry containing the copolymer can then be filtered through, for example, a cheese cloth or a 212 micron screen, to remove the largest particles or aggregates.

The resulting filtered copolymer can be coated onto a substrate, such as, for example, a 24# bond paper, at a coat weight ranging from about 2 to about 6 g/m$^2$ and dried in a heated oven at a temperature preferably ranging from about 80° C. to about 150° C. for a time preferably ranging from about 20 seconds to about 2 minutes. The substrate coated with the copolymer is then ready for use as a release material.

The present inventor has found that a copolymer having a particle size of about 0.1 to 4 microns provides a continuous, film-like coating pattern when coated on a substrate. On the other hand, a copolymer having a particle size of 4–150 microns provides a discrete, non-film-like coating pattern. Generally, a discrete coating pattern produces a release material with stronger release properties or release power. The preferred particle size, in accordance with the invention, is about 0.1 to about 25 microns.

Examples of free radical initiators that can be used in this invention include: benzoyl peroxide, t-amyl peroxyneodecanoate, t-amyl peroxypivalate, t-amylperoxy-2-ethyl-hexanoate (AEH), t-butyl peroxy-isobutyrate, t-amyl perbenzoate, di-t-butyl peroxide, 2,2'-azobis(2-methylbutyronitrile), 2,2'-azobis(2,4-dimethylvaleronitrile), 2,2'-azobis(2-methylpropanenitrile), and the like. A preferred free radical initiator is t-amylperoxy-2-ethyl-hexanoate (AEH).

Partially hydrolyzed polyvinyl alcohol is a preferred suspension agent for use in this invention. However, many other suspension agents can be used, such as starch derivatives, cellulose derivatives, polyacrylamide, and the like.

The release material of the invention is useful, for example, as a backsize material, particularly for repositionable adhesives. The release material may also be used in printable release applications. The release power can be selectively varied to suit a particular application by selectively varying (1) the ratio of the acrylate ester (I) to the comonomer and (2) the particle size of the copolymer.

The following examples further illustrate advantageous features of the present invention and are illustrative of the various features of the present invention.

EXAMPLE 1

30 parts of Petrolite X-5100 were dissolved into 80 parts of vinyl acetate. To this solution, 0.30 part of t-amylperoxy-2-ethylhexanoate (AEH) and 0.11 part of benzoyl peroxide were dissolved. The resultant mixture was emulsified into 150 parts of a 3% Vinol 523 solution in a Waring blender at 65° C. until particles of about 3–5 microns were obtained. Vinol 523 is a partially hydrolyzed polyvinyl alcohol, commercially available from Air Products and Chemicals. The mix was heated to about 80° C. where a reaction exotherm was observed. After that, the mix was held at 105° C. for 2½ hours. Particle sizes of the resultant mix ranged from about 5–20 microns. Coating on a 20# bond paper resulted in very good release properties even against a permanent acrylic adhesive.

EXAMPLE 2

7.5 parts of Petrolite X-5100 were dissolved into 142.5 parts of vinyl acetate. To this solution, 0.38 part of AEH was dissolved. The resultant mixture was emulsified into 150 parts of 3% Vinol 523 solution in a Waring blender at 65° C. until particles of about 3–5 microns were obtained. The mix was heated to about 80° C. where a reaction exotherm was observed. After that, the mix was held at 97° C. for 4 hours. Particle sizes of the resultant mix ranged from about 5–50 microns. Coating on a 20# bond paper resulted in very good release properties even against a permanent acrylic adhesive.

EXAMPLE 3

1.5 parts of Petrolite X-5100 were dissolved into 148.5 parts of vinyl acetate. To this solution, 0.38 part of AEH was dissolved. The resultant mixture was emulsified into 150 parts of 3% Vinol 523 solution in a Waring blender at 65° C. until particles of about 3–5 microns were obtained. The mix was heated to 80° C. where a reaction exotherm was observed. After that, the mix was held at 70° C. for 4 hours and then at 100° C. for 1 hour. There were some aggregates in the mix. After filtering through a cheese cloth, the mix was coated on a 20# bond paper. Very good release properties were obtained.

EXAMPLE 4

7.5 parts of Petrolite X-5100 were dissolved into 44.55 parts of methyl methacrylate and 22.95 parts of 2-ethyl hexyl acrylate. To this solution, 0.19 part of AEH was dissolved. The resultant mixture was emulsified into 225 parts of 2% Vinol 523 solution in a Waring blender at 65° C. until particles of about 3–5 microns were obtained. The mix was heated to 94° C. where a reaction exotherm was observed. After that, the mix was held at 95° C. for 4 hours. There were some particles larger than 1000 microns in the mix. However, the majority were between 1–200 microns. After filtering through a cheese cloth, the mix was coated on a 20# bond paper. Very good release properties were obtained.

It will be apparent to those skilled in the art that various modifications and variations can be made in the release polymer of the invention without departing from the spirit or scope of the invention. Thus, it is intended that the present invention cover the modifications and variations of this invention provided that they come within the scope of the appended claim and their equivalents.

What is claimed is:

1. A release polymer for use with pressure sensitive adhesives comprising a copolymer of:
   (1) about 1 to about 25 percent by weight of an acrylate ester of the formula I:

wherein x is an integer ranging from 30 to about 50; and (2) at least one comonomer selected from the group consisting of a vinyl monomer, an acrylate monomer and a methacrylate monomer.

2. The release polymer of claim 1, wherein said at least one comonomer is selected from the group consisting of vinyl acetate, styrene, acrylonitrile, methacrylonitrile, methyl methacrylate, ethyl acrylate, 2-ethyl hexyl acrylate, isooctyl acrylate, isodecyl acrylate, isodecyl methacrylate, isobutyl acrylate, 4-methyl-2-pentyl acrylate, 2-methylbutyl acrylate, isoamyl acrylate and isononyl acrylate.

3. The release polymer of claim 2, wherein said at least one comonomer is vinyl acetate.

4. The release polymer of claim 2, wherein said at least one comonomer is methyl methacrylate and 2-ethyl hexyl acrylate.

5. The release polymer of claim 1, wherein said copolymer has a particle size distribution ranging from about 0.1 to about 200 microns.

6. The release polymer of claim 1, wherein said copolymer has a particle size distribution ranging from about 0.1 to about 25 microns.

7. The release polymer of claim 1, wherein said copolymer is prepared by suspension polymerization.

8. A pressure sensitive adhesive tape comprising a tape substrate, a pressure sensitive adhesive coated onto at least a portion of the face of said tape substrate, and the release polymer of claim 1 coated onto the backside of said tape substrate.

9. The pressure sensitive adhesive tape of claim 8, wherein said release polymer is coated onto the backside of said tape substrate in a coating weight ranging from about 2 to about 6 g/m².

10. A repositionable label comprising a label substrate, a pressure sensitive adhesive coated onto at least a portion of the face of said label substrate, and the release polymer of claim 1 coated onto at least a portion of the backside of said label substrate.

11. The repositionable label of claim 10, wherein said pressure sensitive adhesive comprises a polymer prepared from 2-ethylhexyl acrylate monomer.

12. A release polymer for use with pressure sensitive adhesives comprising a copolymer of:

(1) an acrylate ester of the formula I:

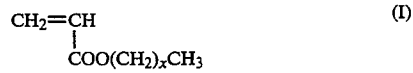

wherein x is an integer ranging from 30 to about 50; and (2) at least one comonomer selected from the group consisting of a vinyl monomer, an acrylate monomer and a methacrylate monomer;

wherein the copolymer has a particle size distribution ranging from about 0.1 to about 25 microns.

13. The release polymer of claim 12, wherein said at least one comonomer is selected from the group consisting of vinyl acetate, styrene, acrylonitrile, methacrylonitrile, methyl methacrylate, ethyl acrylate, 2-ethyl hexyl acrylate, isooctyl acrylate, isodecyl acrylate, isodecyl methacrylate, isobutyl acrylate, 4-methyl-2-pentyl acrylate, 2-methylbutyl acrylate, isoamyl acrylate and isononyl acrylate.

14. The release polymer of claim 13, wherein said at least one comonomer is vinyl acetate.

15. The release polymer of claim 13, wherein said at least one comonomer is methyl methacrylate and 2-ethyl hexyl acrylate.

16. The release polymer of claim 12, wherein said acrylate ester comprises about 1 to about 25% by weight of the copolymer composition.

17. A pressure sensitive adhesive tape comprising a tape substrate, a pressure sensitive adhesive coated onto at least a portion of the face of said tape substrate, and the release polymer of claim 12 coated onto the backside of said tape substrate.

18. The pressure sensitive adhesive tape of claim 16, wherein said release polymer is coated onto the backside of said tape substrate in a coating weight ranging from 2 to 6 g/m².

19. A repositionable label comprising a label substrate, a pressure sensitive adhesive coated onto at least a portion of the face of said label substrate, and the release polymer of claim 12 coated onto the backside of said label substrate.

20. The repositionable label of claim 18, wherein said pressure sensitive adhesive comprises a polymer prepared from 2-ethylhexyl acrylate monomer.

* * * * *